US009225653B2

(12) United States Patent
Kawazoe et al.

(10) Patent No.: US 9,225,653 B2
(45) Date of Patent: Dec. 29, 2015

(54) REMOTE MONITORING SYSTEM WITH IMPROVED BANDWIDTH

(75) Inventors: Hiroshi Kawazoe, Kanagawa (JP); Takuya Kawamura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 122 days.

(21) Appl. No.: 13/534,390

(22) Filed: Jun. 27, 2012

(65) Prior Publication Data

US 2013/0083680 A1 Apr. 4, 2013

(30) Foreign Application Priority Data

Sep. 30, 2011 (JP) ................................ 2011-218676

(51) Int. Cl.
*H04L 12/801* (2013.01)
*H04L 12/24* (2006.01)
*H04L 12/891* (2013.01)

(52) U.S. Cl.
CPC .......... *H04L 47/193* (2013.01); *H04L 41/0896* (2013.01); *H04L 47/41* (2013.01)

(58) Field of Classification Search
CPC .................................................. H04L 20/08477
USPC .................................................. 370/252, 241
See application file for complete search history.

(56) References Cited

U.S. PATENT DOCUMENTS

| 6,233,226 | B1* | 5/2001 | Gringeri et al. | 370/252 |
| 8,060,645 | B1* | 11/2011 | Catania | 709/234 |
| 2002/0131403 | A1* | 9/2002 | Desai et al. | 370/352 |
| 2007/0223529 | A1* | 9/2007 | Lee et al. | 370/468 |
| 2008/0144660 | A1* | 6/2008 | Godlewski | 370/468 |
| 2009/0153561 | A1* | 6/2009 | Sun et al. | 345/441 |
| 2010/0183087 | A1* | 7/2010 | Hosokawa et al. | 375/262 |
| 2012/0005365 | A1* | 1/2012 | Ma et al. | 709/231 |
| 2013/0054679 | A1* | 2/2013 | Jooste | 709/203 |
| 2014/0086256 | A1* | 3/2014 | Raniere | 370/401 |

FOREIGN PATENT DOCUMENTS

| JP | 2009-200611 | 9/2009 |
| JP | 2010-056990 | 3/2010 |

OTHER PUBLICATIONS

Richardson, Tristan; The RFB Protocol, Real VNC Ltd, Nov. 26, 2010, Version 3.8, http://www.realvnc.com/docs/rftbproto.pdf.
Office Action of Notification of Reasons for Refusal for Japanese Patent Application No. 2011-218767 Dated Oct. 2, 2014, 3 pages.

* cited by examiner

*Primary Examiner* — Hassan Kizou
*Assistant Examiner* — Deepa Belur
(74) *Attorney, Agent, or Firm* — Amin, Turocy & Watson, LLP

(57) ABSTRACT

According to one embodiment, a server includes a transmitter, a storage, a determination unit and a controller. The transmitter is configured to transmit data using TCP streams. The storage is configured to store a number of TCP streams which the transmitter used in transmitting the data and a maximum value of a bandwidth which the transmitter used in transmitting the data using the number of TCP streams, in association with each other. The determination unit is configured to determine a number of TCP streams, which the transmitter uses in transmitting new data, based on the stored number, the stored maximum value, and a target value of the bandwidth. The controller is configured to update the stored maximum value when a bandwidth used for transmitting the new data using the determined number is larger than the maximum value associated with the stored number which is identical to the determined number.

12 Claims, 12 Drawing Sheets

FIG. 5

| NUMBER OF TCP STREAMS N | MAXIMUM VALUE OF USED BANDWIDTH $B_m$ (Mbps) | TIME STAMP |
|---|---|---|
| 1 | 8 | 100000 |
| 2 | 14 | 145000 |
| 3 | 18 | 105000 |
| ... | ... | |
| 32 | 32 | 130000 |

FIG. 7

| NUMBER OF TCP STREAMS N | MAXIMUM VALUE OF USED BANDWIDTH Bm (Mbps) | TIME STAMP |
|---|---|---|
| | | |
| | | |
| | | |
| | | |
| | | |

FIG. 8

| NUMBER OF TCP STREAMS N | MAXIMUM VALUE OF USED BANDWIDTH Bm (Mbps) | TIME STAMP |
|---|---|---|
| 1 | 8 | 100000 |
| | | |
| | | |
| | | |
| | | |

FIG. 9

| NUMBER OF TCP STREAMS N | MAXIMUM VALUE OF USED BANDWIDTH Bm (Mbps) | TIME STAMP |
|---|---|---|
| 1 | 8 | 100000 |
| 3 | 9 | 105000 |
| | | |
| | | |
| | | |

FIG. 10

| NUMBER OF TCP STREAMS N | MAXIMUM VALUE OF USED BANDWIDTH Bm (Mbps) | TIME STAMP |
|---|---|---|
| 1 | 8 | 100000 |
| 3 | 9 | 105000 |
| 8 | 8 | 110000 |
| | | |
| | | |

FIG. 11

| NUMBER OF TCP STREAMS N | MAXIMUM VALUE OF USED BANDWIDTH Bm (Mbps) | TIME STAMP |
|---|---|---|
| 1 | 8 | 100000 |
| 3 | 9 | 105000 |
| 8 | 28 | 115000 |
| | | |
| | | |

FIG. 12

| NUMBER OF TCP STREAMS N | MAXIMUM VALUE OF USED BANDWIDTH Bm (Mbps) | TIME STAMP |
|---|---|---|
| 1 | 8 | 100000 |
| 3 | 9 | 105000 |
| 7 | 26 | 120000 |
| 8 | 28 | 115000 |
| | | |

REMOTE MONITORING SYSTEM WITH IMPROVED BANDWIDTH

CROSS-REFERENCE TO RELATED APPLICATION(S)

This application is based upon and claims the benefit of priority from Japanese Patent Application No. 2011-218676, filed Sep. 30, 2011; the entire contents of which are incorporated herein by reference.

FIELD

Embodiments described herein relate generally to a server, a server control method and a computer-readable medium.

BACKGROUND

There is a screen transfer system which transfers information on a screen of a server to a client terminal from the server connected to the client terminal through a network in real time. The system is expected to be applied to, for example, a remote monitoring system.

Most screen transfer systems use TCP/IP as a transmission protocol. When data is transmitted using the TCP/IP transmission protocol, the server passes data to the IP layer while controlling a transmission rate (communication bandwidth) of the data using the TCP stream in the TCP layer, and the IP layer transmits the data to the network.

Such a technique may be used that multiple TCP streams are established between a server and a client terminal, the information on the screen is divided into a plurality of data segments, and the data segments are transmitted in parallel. When the multiple TCP streams are used, the data transmission rate (communication bandwidth) can be improved.

In the screen transfer system, every time a drawing state is changed in a screen area which the server maintains, only differential information (called a screen update) between the previous drawing state and the changed drawing state may be transferred together with information of an area where the change occurs.

An upper limit of the communication bandwidth is determined according to the number of TCP streams.

In particular, the amount of data in the screen update varies depending on change in the screen. Accordingly, when the communication bandwidth is measured for the case where the screen update is transmitted using the certain number of TCP streams, it cannot be determined as to whether the measured communication bandwidth is the upper limit for the certain number of TCP streams or below the upper limit. In particular, when data such as the screen update an amount of which varies largely is transmitted, the measured communication bandwidth may be largely deviated from the upper limit for the certain number of TCP streams.

Accordingly, in a screen transfer system that transmits the screen update through the multiple TCP streams, it is difficult to calculate the upper limit of the communication bandwidth based on the number of TCP streams. As a result, it is also difficult to obtain the optimal number of TCP streams.

BRIEF DESCRIPTION OF THE DRAWINGS

FIG. 5 is an exemplary diagram showing an example of information stored in a storage 104 of the server;

FIG. 7 is a first exemplary diagram showing the storage 104 being updated;

FIG. 8 is a second exemplary diagram showing the storage 104 being updated;

FIG. 9 is a third exemplary diagram showing the storage 104 being updated;

FIG. 10 is a fourth exemplary diagram showing the storage 104 being updated;

FIG. 11 is a fifth exemplary diagram showing the storage 104 being updated; and

FIG. 12 is a sixth exemplary diagram showing the storage 104 being updated.

DETAILED DESCRIPTION

Figure 1:
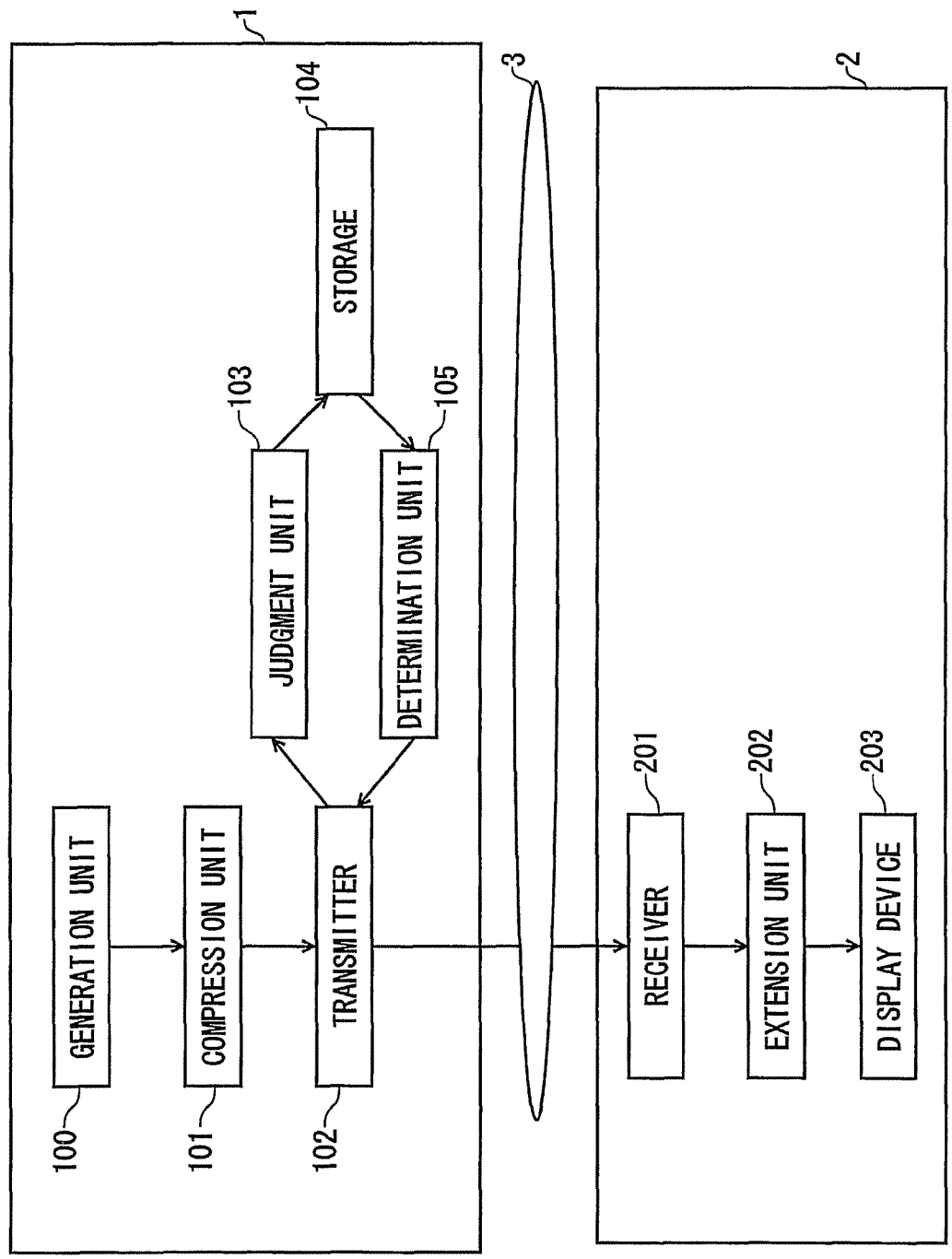
FIG. 1 is an exemplary block diagram illustrating the configuration of a screen transfer system according to an embodiment of the invention.

Various embodiments will be described with reference to the accompanying drawings. However, the same reference numerals refer to the same elements in respective figures, and duplicated description may be omitted.

According to one embodiment, a server includes a transmitter, a storage, a determination unit and a controller. The transmitter is configured to transmit data using multiple TCP streams. The storage is configured to store a number of TCP streams which the transmitter used in transmitting the data and a maximum value of a bandwidth which the transmitter used in transmitting the data using the number of TCP streams, in association with each other. The determination unit is configured to determine a number of TCP streams, which the transmitter uses in transmitting new data, based on the number of TCP streams and the maximum value of the bandwidth, which are stored in the storage, and a target value of the bandwidth. The controller is configured to update the stored maximum value of the bandwidth when a bandwidth used for transmitting the new data using the number of TCP streams determined by the determination unit is larger than the maximum value of the bandwidth associated with the number of TCP streams which is stored in the storage and which is identical to the number of TCP streams determined by the determination unit.

<First Embodiment>

In a screen transfer system according to the first embodiment, an information processing terminal (server 1) serving as a server and an information processing terminal (client terminal 2) serving as a client are connected to each other through a network 3. In this embodiment, the network 3 is an IP network.

Next, the configuration of the server 1 will be described.

Figure 2:
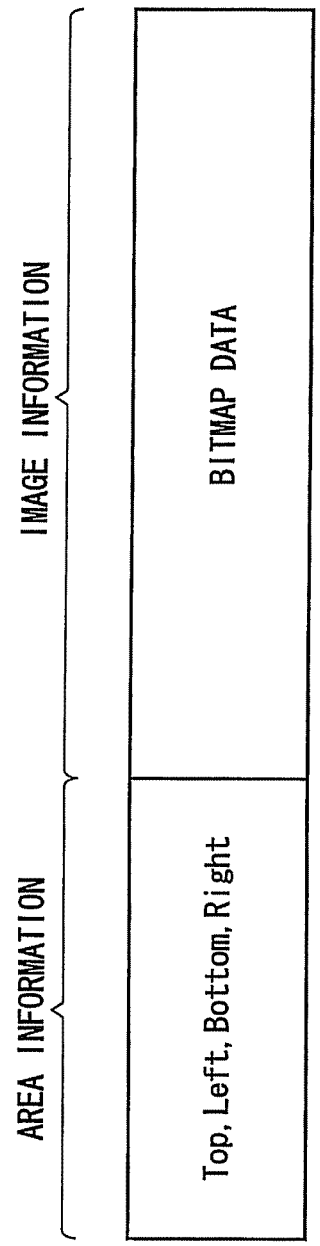
FIG. 2 shows an example of screen update.
Figure 3:
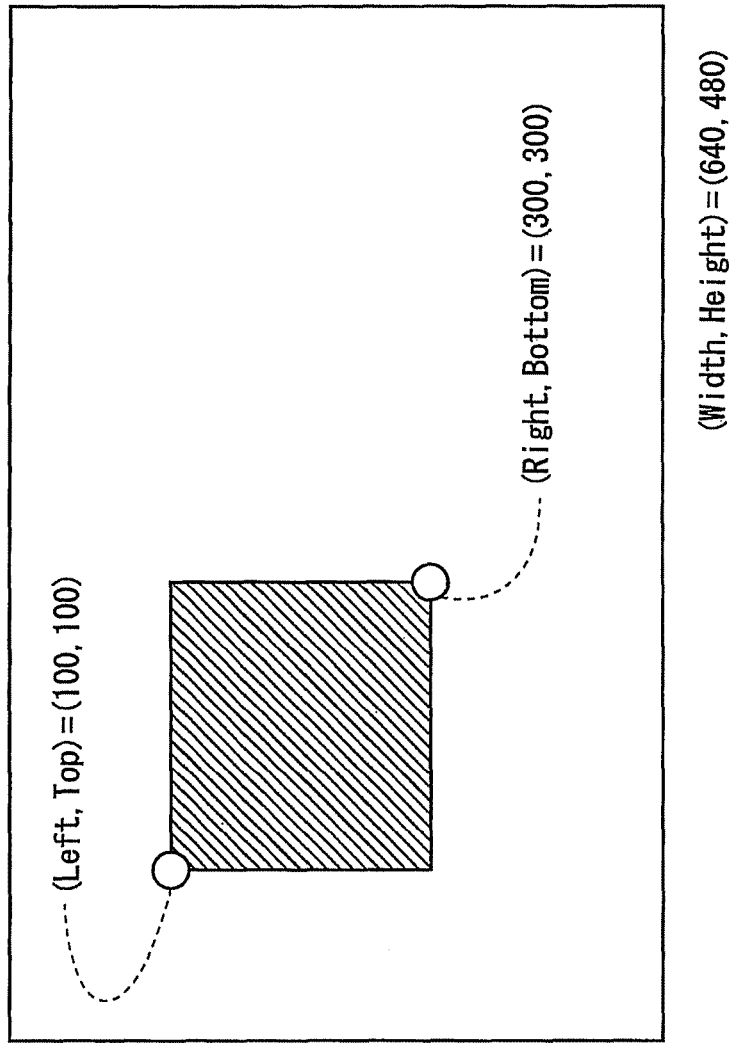
FIG. 3 is an exemplary explanatory diagram showing area information.

A generation unit 100 generates a screen update. The generation unit 100 has a storage area (frame buffer) for holding screen information of the entire screen area. The generation unit 100 rewrites a state of the storage area according to an execution state of an operating system or an application in the server 1 to store the latest screen information. Then, the generation unit 100 outputs the screen update at a regular timing. Herein, the screen update is information representing a difference between the screen information output at a previous time and that output at present. As shown in FIG. 2, the screen update includes area information representing a position of an area in the entire screen area and image information of a corresponding area after updating. The area information includes numerical values representing a display position of the image information in the screen area. For example, as shown in FIG. 3, assuming that coordinates of a top left corner of the screen area is (0, 0) and that the coordinates of a bottom right of the screen area is (Width, Height), the area information is represented by rectangular information including a left top coordinate (Left, Top) and a right bottom coordinate (Right, Bottom) of a display position. The image information includes bitmap data (for example, RGB color values in each pixel of the rectangular) after updating the area corresponding to the area information. The generation unit 100 holds the screen information output at a previous time in addition to the latest screen information and extracts differentials therebetween at a regular timing to output the extracted differentials to a compression unit 101 as the screen update.

The compression unit 101 performs a compression process such as ZLIB or JPEG for the image information included in the screen update.

A transmitter 102 transmits the screen update. For example, the transmitter 102 converts the input screen update into a format which can be transmitted on the network 3 and transmits the converted screen update to the client terminal 2. The transmitter 102 uses TCP/IP as a transmission protocol. The transmitter 102 establishes multiple TCP streams between the transmitter 102 and the client terminal 2. When the screen update needs to be transmitted, the transmitter 102 divides the screen update into segments having appropriate sizes thereafter, allocates a number representing an order to each of the segments and transmits the segments of the screen update in parallel using the respective streams. In this case, the transmitter performs the transmission process using the TCP streams the number of which is determined by a determination unit 105 which will be described later. The number of TCP streams to be used is dynamically changed based on the determination of the determination unit 105. However, an initial value of the number of TCP streams is set to an appropriate value from outside. The transmitter 102 may calculate a bandwidth which was used by itself (data transmission rate). For example, the transmitter 102 may be able to calculate a bandwidth which was used for recent 5 seconds and output the calculated bandwidth in response to a demand from outside.

A judgment unit 103 judges as to whether or not an amount of used bandwidth for the number of TCP streams which is being used currently by the transmitter 102 exceeds an amount of used bandwidth, which is stored in a storage 104 and which is associated with the number of the TCP streams. When the judgment unit 103 judges that the amount of TCP streams, which is being used currently, exceeds the amount of the used bandwidth stored in the storage 104, the judgment unit 103 overwrites (updates) the amount of used bandwidth stored in the storage 104 with the amount of the bandwidth which the transmitter 102 is using currently. When the judgment unit 103 judges that a predetermined time or more have elapsed since the judgment unit 103 last updated certain information stored in the storage 104, the judgment unit 103 issues a command to delete the certain information. The judgment unit 103 performs the judgment and updates the storage 104 according to the judgment, at a predetermined timing or regularly.

The storage 104 stores a pair of (i) the number of TCP streams used by the transmitter 102 and (ii) a maximum value of used bandwidth when that number of TCP streams is used. The storage 104 stores a time at which the maximum value of used bandwidth is stored, together. The maximum value of used bandwidth is updated every time the judgment unit 103 performs the judgment process. As will be described below, the number of TCP streams used by the transmitter 102 varies depending on the determination of the determination unit 105. Every time the number of TCP streams varies, the storage 104 updates stored contents together with a value of a used bandwidth when the varied number of TCP streams is used.

The determination unit 105 determines the number of TCP streams used by the transmitter 102, by referring to the pairs of the numbers of TCP streams and the maximum values of used bandwidth, which are stored in the storage 104. The determination unit 105 notifies the determined number of TCP streams to the transmitter 102 and instructs the transmission unit 102 to perform the transmission process using the notified number of TCP streams. Herein, the determination unit 105 determines the number of TCP streams, which is judged to be the optimal number of TCP streams, as the number of TCP streams used by the transmitter 102. A method of determining the number of TCP streams will be described later. Herein, the optimal number of TCP streams refers to the number of TCP streams which can satisfy the allocated bandwidth and which is the minimum number of TCP streams. The transmitter 102 performs the transmission process using the optimal number of TCP streams, which is determined by the determination unit 105. However, as described above, a used bandwidth is measured when the transmitter 102 performs the transmission process using the number of TCP streams (the optimal number of TCP streams) determined by the determination unit 105. If a measurement result exceeds the used bandwidth stored in the storage 104, the maximum value of used bandwidth stored in the storage 104 is updated.

Next, the configuration of the client terminal 2 will be described.

A receiver 201 receives the screen update from the server 1 through the network 3.

An extension unit 202 performs an extension process for the compressed image information included in the screen update.

A display device 203 has a storage area (frame buffer) for storing the screen information of the entire screen area. When the screen update is received, the display device 203 performs overwrites (updates) information on the storage area represented by the area information with the image information. They display device 203 visually presents the screen information to a user.

<<Processes Performed by Screen Transfer System>>

Next, processes performed by the screen transfer system according to this embodiment will be described with reference to the accompanying drawings.

<<Operation Just after Starting of Screen Transfer>>

First, the operation just after the starting of the screen transfer will be described.

The starting of the screen transfer is instructed by a user of the server 1. The user inputs an IP address of the access-destination client terminal 2 into the server 1 through a GUI. The input information is notified to the transmitter 102. The transmitter 102 establishes the predetermined number of TCP streams with the terminal having the IP address. Hereinafter, it is assumed that the predetermined number is 32. The transmitter 102 negotiates with the receiver 201 as to how many TCP streams (the initial value of the number of TCP streams) among the established TCP streams are used to transmit the screen update. The negotiation may be performed according to a predetermined method. In this embodiment, it is assumed that, as a result of the negotiation, 1 is fixedly used as the initial number of TCP streams. Thereafter, the number of TCP streams used by the transmitter 102 is changeable at a desirable timing. The number of TCP streams is held in the transmitter 102.

<<Operation from Transmission of Screen Update to Display of Screen Update>>

Next, the operation from a time when the server 1 transmits the screen update to the client terminal 2 to a time when the client terminal 2 displays the screen update will be described.

When execution of the screen transfer starts, the generation unit 100 updates a state of the frame buffer in response to an, execution state of an application or operating system of the server 1. The generation unit 100 inquires, at a regular timing (for example, every 50 msecs), the compression unit 101 as to whether or not the compression process is executable at present. When the compression process is not executable, nothing is performed. When the compression process is executable, a screen update generation process described below is performed. The generation unit 100 separately holds the state of the frame buffer when the previous screen update was acquired. A storage area for holding the previous screen update is referred to as a buffer for acquiring the screen update. The generation unit 100 compares the screen information in the frame buffer and that in the buffer for acquiring the screen update to extract area information of a partial area having a difference and image information of the partial area. Then, the generation unit 100 generates the screen update using the area information and the image information. An example of the screen update has already been shown in FIG. 2. When preparation of the screen update is completed, the generation unit 100 overwrites (updates) contents of the buffer for acquiring the screen update with contents of the frame buffer, and sends the acquired screen update to the compression unit 101.

When the compression unit 101 receives the screen update from the generation unit 100, the compression unit 101 compresses the image information included in the screen update. Upon completion of the compression process, the compression unit 101 inquires the transmitter 102 as to whether or not the transmission process is executable at present. if the transmission process is not executable, the compression unit 101 inquires of the transmitter 102 again after stand-by for a while. If the transmission process is executable, the compression unit 101 sends the screen update after compression to the transmitter 102 and request transmission.

When the compression unit 101 receives, from the generation unit 100, the inquiry as to whether or not the compression process is executable, the compression unit 101 answers that the compression process is unavailable if the compression process is being executed, and if not, the compression unit 101 answers that the compression process is available.

Figure 4:
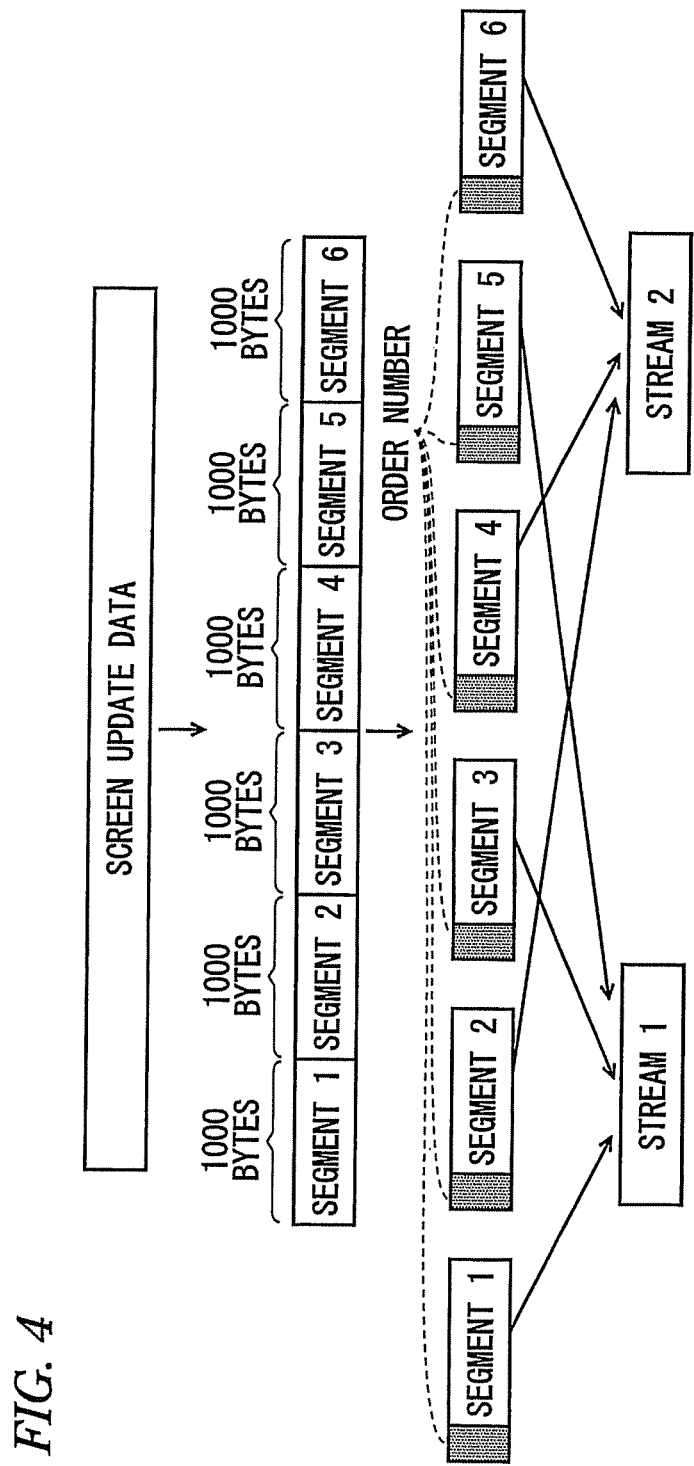
FIG. 4 is an exemplary explanatory diagram showing a transmission process in a server.

The transmitter 102 performs the transmission process upon receipt of the screen update. FIG. 4 is an exemplary diagram showing the transmission process performed by the transmitter 102. The transmission process is performed based on the value of the number of TCP streams held in the transmitter 102. First, the transmitter 102 divides data of the screen update into segments having a predetermined size (for example, 1,000 bytes) as shown in FIG. 4. Also, the transmitter 102 assigns order numbers to the respective segments. The order numbers are information which is necessary for the receiver 201 to obtain data of original screen update by combining the respective segments. For example, the order numbers may be serial numbers of the segments that begin with 1 or a byte number of an offset from a data header. After the order numbers are assigned, the respective segments are distributed to the multiple TCP streams. FIG. 4 shows an example of a case in which the number of TCP streams is two. The odd numbered segments are distributed to a first stream, and the even numbered segments are distributed to a second stream. Each stream is transmitted to the client terminal 2 through the network 3 after headers of TCP/IP are given to the distributed segments, respectively.

The transmitter 102 calculates and holds the used bandwidth (unit: Mbps). The transmitter 102 may calculate the used bandwidth according to a desirable method. For example, the transmitter 102 may hold the size of data transmitted for past 5 seconds and set a value acquired by dividing the size by 5 seconds as the used bandwidth. The transmitter 102 answers the current used bandwidth and the number of TCP streams which are being used currently every time the transmitter 102 receives a request from the judgment unit 103.

When the transmitter 102 receives from the compression unit 101 an inquiry as to whether or not the transmission process is executable, the transmitter 102 answers that the transmission process is not executable if the transmission process is being executed, and if not, answers that the transmission process is executable.

The receiver 201 of the client terminal 2 receives the respective segments from the server 1 through the multiple TCP streams. The receiver 201 removes each header of TCP/IP from the received data, combines the respective segments based on the assigned order numbers, and reassembles data of the screen update. Then, the receiver 201 removes the order numbers. The receiver 201 sends the reassembled screen update to the extension unit 202 and requests the extension unit 202 to extend the screen update.

When the extension unit 202 receives the screen update, the extension unit 202 extends the image information included in the screen update. When the extension unit 202 completes the extension process, the extension unit 202 sends the screen update to the display device 203 and requests the display device 203 to display the screen update. The display device 203 has a frame buffer that holds the screen information of the entire screen area and overwrites (updates) area information specified by the area information of the screen update with the image information after the extension. The state of the display device 203 is visually presented to the user.

As described above, a processing flow from the generation to the display of the screen update has been described.

<<Judgment Process>>

Figure 6:
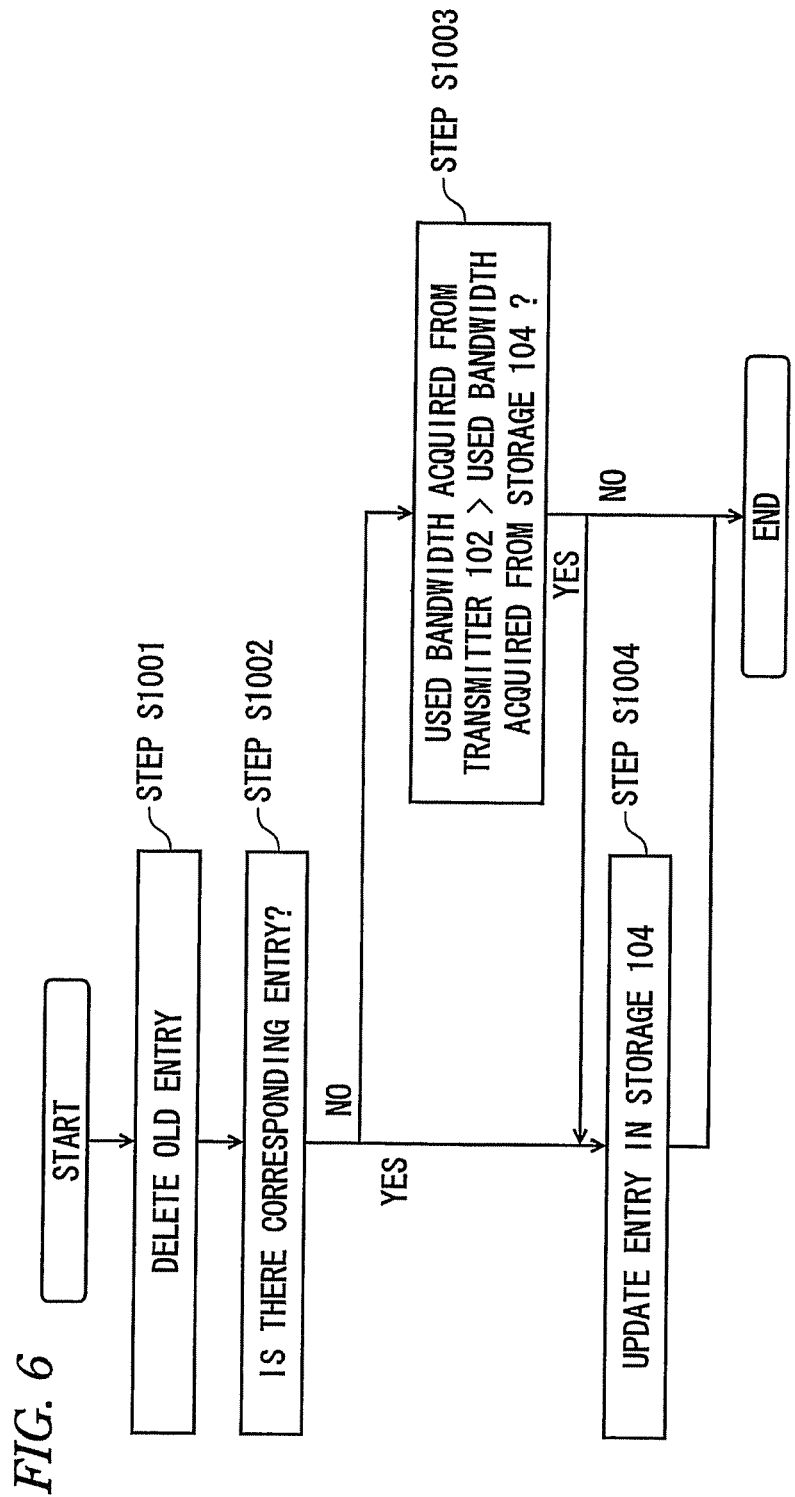
FIG. 6 is an exemplary flow diagram showing a judgment process of a judgment unit 103.

Next, the judgment process of the judgment unit 103 will be described with reference to FIG. 6. The judgment unit 103 starts the judgment process at a desirable timing (for example, at an interval of 5 seconds).

First, the judgment unit 103 acquires all entries from the storage 104. The storage 104 holds a table shown in FIG. 5. The table stores the number N of TCP streams, the maximum value of used bandwidth, and a time at which each entry has been last updated. Next, the judgment unit 103 acquires a current time and compares the acquired current time with a value of a time stamp of each entry. If there is a value of a time stamp, which is older by a predetermined time period or more (for example, 30 seconds) than the current time, the judgment unit 103 judges that an entry having such a time stamp is old and delete that entry from the storage 104 (step S1001).

Next, the judgment unit 103 requests the transmitter 102 a pair of the value of the number of TCP streams and the value of the bandwidth which is currently used. When the judgment unit 103 acquires the values, the judgment unit 103 then examines as to whether or not there is an entry having the same value as the number of TCP streams acquired from the transmitter 102 among the entries acquired from the storage 104 (step S1002). If there isn't such an entry, the judgment unit 103 stores the number of TCP streams, the used bandwidth, and the current time in the storage 104 (step S1003). Meanwhile, if there is an entry having the same value as the number of TCP streams acquired from the transmitter 102, a pair of a maximum value of a used bandwidth of the entry and the value of the time stamp of the entry is output to the judgment unit 103. If there isn't such an entry, that effect is notified to the judgment unit 103.

The judgment unit 103 compares the bandwidth acquired from the storage 104 with the bandwidth acquired from the transmitter 102 when the pair of the corresponding maximum value of the used bandwidth and the corresponding value of the time stamp can be acquired from the entry of the storage 104 (step S1003). In this case, if the bandwidth being used and acquired from the transmitter 102 exceeds the used bandwidth acquired from the storage 104, the value of the used bandwidth of the entry of the storage 104 is updated. Meanwhile, if the bandwidth acquired from the transmitter 102 does not exceed the bandwidth acquired from the storage 104, the value of the used bandwidth of the entry is not updated.

The above process is executed repeatedly as time elapses, and the pair of the number of TCP streams and the maximum value of used bandwidth is stored in the storage 104 together with a time when the update is performed. An entry which has been existed for a predetermined time or more is appropriately deleted.

<<Determination Process>>

Next, the determination process of the determination unit 105 will be described. The determination unit 105 starts the determination process at a desirable timing (for example, at an interval of 5 seconds). Alternatively, every time the judgment process of the judgment unit 103 ends, the judgment unit 103 may request the determination unit 105 to start the determination process.

The determination unit 105 has a target value of the used bandwidth. The target value may be statically fixed in the determination unit 105 or may be designated by the user through the GUI. Alternatively, the target value may be approximately rewritten with another value input from outside.

According to a process which will be described below, the determination unit 105 determines the value of the optimal number of TCP streams to be used so that a bandwidth used for the data transmission performed by the transmitter 102 becomes the closest to the target value of the used bandwidth.

Hereinafter, for an explanation purpose, the target value of the used bandwidth, which the determination unit 105 holds, will be denoted by Bs. Among the information stored in the storage 104, the numbers of TCP streams and the maximum values of the used bandwidth will be denoted by N and Bm, respectively.

The determination unit 105 requests to acquire all entries from the storage 104. Firstly, the determination unit 105 selects the smallest value among Bm which are included in the acquired information and which exceed the target value Bs. Bm selected here will be denoted by Bmax, and the number of TCP streams which is stored in association with Bmax will be denoted by Nmax. If there is no Bm which exceeds Bs, the largest Bm is treated as Bmax, and the number of TCP streams, which is stored in association with Bmax, is treated as Nmax.

Next, the determination unit 105 calculates the value of the optimal number of TCP streams to be used by Round (Bs÷Bmax×Nmax) with using Bmax and Nmax. Herein, Round is a function to round off to an integer value. That is, the bandwidth used per one TCP stream is simply regarded as (Bmax÷Nmax) and then, the target bandwidth Bs is divided by (Bmax÷Nmax) to calculate the optimal number of TCP streams.

Selection of Bmax and Nmax is not limited to the above-described method. For example, Bm having the largest value among Bm which do not exceed Bs may be selected as Bmax. Alternatively, Bm having the smallest value among absolute values of a difference between Bs and Bm may be selected as Bmax. As such, since the optimal number of TCP streams is determined by selecting Bm close to the target value Bs as Bmax, it is expected that a bandwidth which will be used thereafter would be much closer to Bs. This effect is remarkable when the number of used TCP streams and an upper limit of an available bandwidth at that time have anon-linear relationship.

The value of the optimal number of TCP streams may be acquired according to a method other than the above calculation method. For example, instead of the Round function to round off, a Floor function to truncate the decimal point or less or a Ceil function to round up may be used. When the decimal point or less is truncated, the number of TCP streams which makes an actually used bandwidth be below Bs would be selected. This calculation method is effective particularly in a circumstance where we want to minimize the adverse impact on the operation of another application that shares the same communication path. When the decimal point or less is rounded up, the number of TCP streams which would make the actually used bandwidth exceed Bs is selected. This calculation method is effective particularly in a circumstance where there is a demand to ensure a predetermined quality of screen transfer (for example, the number of frames per unit time) as much as possible.

In the above examples, the bandwidth used per one TCP stream is calculated and then, the optimal number of TCP streams is determined. However, it is not necessary to limit the determination method to this method. For example, when the determination unit 105 may examine the entries acquired from the storage 104, and if there is an entry having the value of Bm identical to Bs, the determination unit 105 may determine the value of the number N of TCP streams corresponding to such Bm as the optimal number of TCP streams. Alternatively, a threshold value Th may be set in advance, and if there is an entry having a difference between Bm and Bs that is equal to or less than Th, the determination unit 105 may determine the value of the number N of TCP streams corresponding to such Bm as the optimal number of TCP streams.

The determination unit 105 outputs the determined value to the transmitter 102 and requests the transmitter 102 to apply the optimum number of TCP streams. Then, the transmitter 102 reflects the designated number of TCP streams.

<<Examples of Judgment Process of Judgment Unit 103 and Determination Process of Determination Unit 105>>

Next, description will be given on an example of calculation which the determination unit 105 executes when determining the optimal number of TCP streams. Specifically, description will be given on such an example that, at the time of 100,000, 105,000, 110,000, 115,000, and 120,000 from the start of the screen transfer, the storage 104 is updated by the process of the judgment unit 103 and the determination unit 105 performs the determination process based on the updated information. FIGS. 7 to 12 are diagrams 1 to 6 showing how the storage 104 is updated as time elapses.

Here, it is assumed that the target value Bs stored in the determination unit 105 is 25 Mbps. Just after the screen transfer starts, no information is stored in the storage 104 as shown in FIG. 7. Then, the judgment unit 103 performs the judgment process at the time of 100,000. It is also assumed that, as a result, the state of the storage 104 is updated as shown in FIG. 8. It is further assumed that thereafter, the determination unit 105 starts the determination process. At this time, the determination unit 105 selects 8 Mbps as Bmax and 1 as Nmax. Based on these values, the determination unit 105 calculates the optimal number of TCP streams by Round (25÷8×1)=Round (3.125)=3. The determination unit 105 notifies 3 as the number of TCP streams to the transmitter 102. Then, the transmitter 102 transmits the screen update using three TCP streams.

Next, it is assumed that the judgment unit 103 performs the judgment process again at the time of 105,000. It is also assumed that a pair of N and Bm acquired from the transmitter 102 is N=3 and Bm=9 Mbps. FIG. 9 shows a state just after such information is stored in the storage 104. Then, it is further assumed that the determination unit 105 starts the determination process. The determination unit 105 selects 9 Mbps as Bmax and 3 as Nmax and calculates the optimal number of TCP streams by Round (25÷9×3)=Round (8.333)=8. Hereinafter, the transmitter 102 uses eight TCP streams for the screen transfer.

Next, it is assumed that the judgment unit 103 performs the judgment process again at the time of 110,000. It is also assumed that a pair of N and Bm acquired from the transmitter 102 is N=8 and Bm=8 Mbps. FIG. 10 shows a state just after such information is stored in the storage 104. It is further assumed that then, the determination unit 105 starts the determination process. The determination unit 105 selects 9 Mbps as Bmax and 3 as Nmax (it should be noted that if there is no Bm which exceeds Bs, the largest Bm value is selected as Bmax). Accordingly, 8 is still determined as the optimal number of TCP streams.

Next, it is assumed that the judgment unit 103 performs the judgment process again at the time of 115,000. It is also assumed that a pair of N and Bm acquired from the transmitter 102 is N=8 and Bm=28 Mbps. FIG. 11 shows a state just after such information is stored in the storage 104 (it should be noted that the value of Bm with respect to N=8 is updated with 28 Mbps). It is further assumed that then, the determination unit 105 starts the determination process. The determination unit 105 selects 28 Mbps as Bmax and 8 as Nmax and determines the optimal number of TCP streams by Round (25÷28×8)=Round (7.143)=7. Hereinafter, the transmitter 102 uses seven TCP streams.

Next, it is assumed that the judgment unit 103 performs the judgment process again at the time of 120,000. It is also assumed that a pair of N and Bm acquired from the transmitter 102 is N=7 and Bm=26 Mbps. FIG. 12 shows a state just after such information is stored in the storage 104. It is further assumed that then, the determination unit 105 starts the determination process. The determination unit 105 selects 26 Mbps as Bmax and 7 as Nmax (it should be noted that if there are plural Bm which exceed Bs, the smallest Bm is set as Bmax). The determination unit 105 determines the optimal number of TCP streams by Round (25÷26×7)=Round (6.731)=7. Hereinafter, the transmitter 102 uses seven TCP streams.

Thereafter, the similar processes as described above will be repeated.

The judgment unit 103 repeatedly performs the judgment process as time elapses so that the maximum value Bm of the bandwidth used by the transmitter 102 can be continuously updated for each number N of TCP streams stored in the storage 104 (for example, as shown in FIG. 11, when the number of TCP streams is 8, the maximum value of the used bandwidth is updated from 8 to 28). As a result, the determination unit 105 can perform the determination process based on the maximum value of the used bandwidth, which was used by the transmitter 102 for each number N of TCP streams in the past.

As described above, in this embodiment, the maximum value of the used bandwidth at the time of using the certain number of TCP streams is stored, and the optimal number of TCP streams is determined based on the stored maximum value. In the data transmission such as the screen transfer, data to be transmitted is generated only when the screen information is changed. In this embodiment, since the number of TCP streams is determined by using the maximum value of the bandwidth used in the past, the optimal number of TCP streams is determined while a value of a used bandwidth measured in a period of time during which a generation amount of the data to be transmitted is small is excluded. Thereby, the number of TCP streams can be determined appropriately.

Also, in this embodiment, determining of the optimal number of TCP streams is repeatedly performed to update the number of TCP streams used for transmission. Therefore, the actually used bandwidth can be made close to the target value. Even if the target value of the used bandwidth is changed while the screen transfer is being performed, the number of TCP streams can be adjusted in response to the change of the target value of the used bandwidth.

Furthermore, in this embodiment, the bandwidth used per one TCP stream is calculated, and the number of TCP streams is determined based on the calculated bandwidth. Therefore, unlike a method of changing the number of TCP streams one by one, it is possible to shorten a time that is required to make the actually used bandwidth reach in the neighborhood of the target value.

Furthermore, in this embodiment, the process of deleting the entry which has existed for the predetermined time or more is performed. Thereby, such an effect can be expected that a measurement result of the used bandwidth which is too old can be excluded from determination source of the optimal number of TCP streams. This is particularly effective in the screen transfer in which a generation pattern of the screen update varies momentarily.

In this embodiment, although the value of 1 is fixedly used when the initial value of the number of TCP streams is determined, it is not necessary to limit the method for determining the initial value of the number of TCP streams thereto. The initial value of the number of TCP streams may be determined by various methods. For example, the number of TCP streams which was used when the previous screen transfer was executed may be stored in a file or the like, and the stored number may be read out and used when execution of the current screen transfer starts. Although the value of the optimal number of TCP streams depends on a condition of a communication path, there is little possibility that an extreme difference occurs between the circumstance of the communication path in the previous screen transfer and the circumstance in the current screen transfer. Accordingly, it is expected that the bandwidth obtained in conjunction with the number of TCP streams, which is acquired as described above, would be close to the target value. As a result, it is possible to shorten a time that is required to make the used bandwidth reach in the neighborhood of the target value. Also, when the previous number of TCP streams is stored in the file, temporal information such as a time or a day at that time may be stored together, and such a judgment may be made that the value is adopted if such information is matched, when such information is read out. In general, there is a high possibility that the condition of the communication path at the same time (the same hour) or the same day would be similar.

Accordingly, it becomes possible to further shorten time that is required to make the used bandwidth reach in the neighborhood of the target value.

In the above examples, the screen transfer system transmitting the screen information has been described as the embodiments. However, it is not necessary to limit a type of the transmitted information to the screen information. The transmitted data may be desirable information having such a characteristic that an amount of transmitted data varies with time. For example, it is assumed that a system transmits moving image data and that an amount of encoded data (an amount of transmitted data) temporally varies depending on contents of a moving image such as a magnitude of a motion. In this case, the above embodiments may be modified so that the transmitted information is the encoded moving image data. Alternatively, it is assumed that a system transmits voice data in which an amount of encoded data temporally varies depending on contents of voice such as existence/absence of speech or a frequency of speech. In this case, the above embodiments may be modified so that the transmitted information is the encoded voice data.

For example, the server 1 may be implemented by using a general-purpose computer device as basic hardware. That is, the generation unit 100, the compression unit 101, the transmitter 102, the judgment unit 103, the storage 104, and the determination unit 105 may be implemented by causing a processor mounted on the computer device to execute a program. In this case, the server 1 may be implemented by installing the program in the computer device in advance. Alternatively, the program may be stored in a computer-readable storage medium such as a CD-ROM or distributed through the network. Then, the program may be appropriately installed into the computer device. The storage 104 may be implemented by appropriately using a storage medium such as a memory or a hard disk, which is built-in or externally attached to the computer device, or a computer-readable storage medium such as a CD-R, a CD-RW, a DVD-RAM, or a DVD-R.

According to the exemplary embodiments described as above, the optimal number of TCP streams can be determined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A server comprising:
    a transmitter configured to divide data into fragments and transmit the fragments using multiple TCP streams;
    a storage configured to store an amount of TCP streams which the transmitter used in transmitting the fragments and to store a maximum value of a bandwidth within an arbitrary time period which the transmitter used in transmitting the fragments using the multiple TCP streams, in association with the amount of TCP streams;
    a determination unit configured to determine a number of TCP streams, which the transmitter uses in transmitting new data, based on the amount of TCP streams and the maximum value of the bandwidth, which are stored in the storage, and a target value of the bandwidth; and
    a controller, wherein when the bandwidth used for transmitting the new data using the number of TCP streams determined by the determination unit is larger than the maximum value of the bandwidth associated with the amount of TCP streams which is stored in the storage and which is identical to the number of TCP streams determined by the determination unit, the controller is configured to update the maximum value of the bandwidth associated with the amount of TCP streams which is stored in the storage and which is identical to the number of TCP streams determined by the determination unit.

2. The server of claim 1, wherein if the amount of TCP streams which is identical to the number of TCP streams determined by the determination unit is not stored in the storage, the controller causes the storage to store the number of TCP streams determined by the determination unit and the bandwidth used for transmitting the new data using the number of TCP streams determined by the determination unit in association with each other.

3. The server of claim 1, wherein an amount of the fragments transmitted by the transmitter varies with time.

4. The server of claim 3, wherein the fragments transmitted by the transmitter includes information that updates screen information which a client terminal connected through a network displays.

5. The server of claim 1, wherein
    the determination unit calculates a bandwidth per one TCP stream for the number of TCP streams based on the number of TCP stream and the maximum value of the bandwidth, which are stored in the storage, and
    the determination unit determines the number of TCP streams which the transmitter uses in transmitting the new data, based on a ratio between the target value of the bandwidth and the bandwidth per one TCP stream.

6. The server of claim 1, wherein
    the storage stores one or more numbers of TCP streams which the transmitter used in transmitting the fragments and one or more maximum values of bandwidths each of which the transmitter used in transmitting the fragments using the corresponding number of TCP streams, in association with each other, and
    the determination unit compares the target value of the bandwidth with the maximum values of the bandwidths stored in the storage to determine the number of TCP streams stored in association with the maximum value of the bandwidth, which is closest to the target value of the bandwidth among the stored maximum values of the bandwidths as the number of TCP streams which the transmitter uses in transmitting the new data.

7. The server of claim 5, wherein the determination unit determines a value acquired by rounding off the ratio between the target value of the bandwidth and the bandwidth per one TCP stream as the number of TCP streams which the transmitter uses in transmitting the new data.

8. The server of claim 5, wherein the determination unit determines a value acquired by truncating a decimal point or less of the ratio between the target value of the bandwidth and the bandwidth per one TCP stream as the number of TCP streams which the transmitter uses in transmitting the new data.

9. The server of claim 5, wherein the determination unit determines a value acquired by rounding up a decimal point or less of the ratio between the target value of the bandwidth and the bandwidth per one TCP stream as the number of TCP streams which the transmitter uses in transmitting the new data.

10. The server of claim 1, wherein for a pair of (i) the amount of TCP streams which the transmitter used in transmitting the fragments and (ii) the maximum value of the bandwidth which the transmitter used in transmitting the fragments using the amount of TCP streams, if a predetermined time or more have elapsed since the controller last updates the pair, the controller deletes the pair in the storage.

11. A method of controlling a server including
- a transmitter configured to divide data into fragments and transmit the fragments using multiple TCP streams, and
- a storage configured to store, in association with each other:
- an amount of TCP streams which the transmitter used in transmitting the fragments, and
- a maximum value of a bandwidth within an arbitrary time period which the transmitter used in transmitting the fragments using the amount of TCP streams, the method comprising:
- determining an amount of TCP streams, which the transmitter uses in transmitting new data, based on the maximum value of the bandwidth and the amount of TCP streams which the transmitter used in transmitting the fragments, which are stored in the storage, and a target value of the bandwidth; and
- updating the stored maximum value of the bandwidth when a bandwidth used for transmitting the new data using the determined amount of TCP streams is larger than the maximum value of the bandwidth associated with the amount of TCP streams which is stored in the storage and which is identical to the determined amount of TCP streams.

12. A non-transitory computer-readable storage medium storing a program causes a server including:
- a transmitter configured to divide data into fragments and transmit the fragments using multiple TCP streams, and
- a storage configured to store, in association with each other,
- an amount of TCP streams which the transmitter used in transmitting the fragments, and
- a maximum value of a bandwidth within an arbitrary time period which the transmitter used in transmitting the fragments using the amount of TCP streams, to execute:
- determining an amount of TCP streams, which the transmitter uses in transmitting new data, based on the amount of TCP streams and the maximum value of the bandwidth, which are stored in the storage, and a target value of the bandwidth; and
- updating the stored maximum value of the bandwidth when a bandwidth used for transmitting the new data using the determined amount of TCP streams is larger than the maximum value of the bandwidth associated with the amount of TCP streams which is stored in the storage and which is identical to the determined amount of TCP streams.

* * * * *